United States Patent
You

(10) Patent No.: US 9,237,151 B2
(45) Date of Patent: Jan. 12, 2016

(54) SECURE ACCESS SYSTEM AND OPERATING METHOD THEREOF

(71) Applicant: LG CNS CO., LTD., Seoul (KR)

(72) Inventor: Jo Geon You, Seoul (KR)

(73) Assignee: LG CNS CO., LTD., Seoul (KR)

( * ) Notice: Subject to any disclaimer, the term of this patent is extended or adjusted under 35 U.S.C. 154(b) by 43 days.

(21) Appl. No.: 14/295,189

(22) Filed: Jun. 3, 2014

(65) Prior Publication Data

US 2015/0350199 A1 Dec. 3, 2015

(51) Int. Cl.
G06F 7/04 (2006.01)
H04L 29/06 (2006.01)
H04L 29/08 (2006.01)

(52) U.S. Cl.
CPC ............ *H04L 63/0853* (2013.01); *H04L 67/10* (2013.01)

(58) Field of Classification Search
CPC ..... H04L 63/0853; G06F 21/77; G06F 21/70; G06F 2221/2135; G06F 2221/2149
USPC ........................................................... 726/9
See application file for complete search history.

(56) References Cited

U.S. PATENT DOCUMENTS

| 8,322,610 | B2* | 12/2012 | Guthery | ................ | G06F 21/606 235/382 |
| 8,608,064 | B2* | 12/2013 | Xu | ......................... | G06Q 20/20 235/380 |
| 2002/0056747 | A1* | 5/2002 | Matsuyama | ........ | G07C 9/00039 235/382 |
| 2010/0211488 | A1* | 8/2010 | McSpadden | ............ | G06F 21/10 705/34 |

FOREIGN PATENT DOCUMENTS

| WO | WO 2009066271 A2 * | 5/2009 | .............. G06F 21/35 |
| WO | WO 2010/033944 A2 | 3/2010 | |
| WO | WO 2010/033944 A3 | 3/2010 | |
| WO | WO 2013/109134 A1 | 7/2013 | |

OTHER PUBLICATIONS

European Search Report for Application No. 15170461.6, dated Oct. 26, 2015.

* cited by examiner

*Primary Examiner* — Samson Lemma

(57) ABSTRACT

A method of operating a secure access module (SAM) includes receiving an operation parameter via a terminal from a management server, the operation parameter including a registered value indicating a permissible range for operation of the SAM, receiving an authentication request for providing a card-related service from the terminal when a corresponding card is coupled to the terminal, determining whether the SAM is within the permissible range for operation in response to the authentication request, and transmitting information on a determination result to the terminal.

4 Claims, 10 Drawing Sheets

SECURE ACCESS SYSTEM AND OPERATING METHOD THEREOF

BACKGROUND

The background section provided herein is for the purpose of generally presenting the context of the disclosure. Work of the presently named inventors, to the extent the work is described in this section, as well as aspects of the description that may not otherwise qualify as prior art at the time of filing, are neither expressly nor impliedly admitted as prior art against the present disclosure.

A secure access module or secure application module (SAM), which is provided for a smart card, encrypts communication data so as to prevent information exposure, and authenticates and verifies communication messages. The SAM may be implemented in hardware or software. Furthermore, the SAM may store electronic values transferred from the smart card. Thus, when unauthorized use occurs compromising the stored electronic values due to loss or robbery, secure transactions cannot be ensured.

SUMMARY

Embodiments of the present disclosure have been made in an effort to provide an operating method of a secure access system. Embodiments are directed to preventing a loss caused by unauthorized use due to loss or robbery of a secure access module (SAM), which is used for on/offline transaction of a smart card.

In accordance with an embodiment of the preset disclosure, a method of operating a secure access module (SAM) includes: receiving an operation parameter via a terminal from a management server, the operation parameter including a registered value indicating a permissible range for operation of the SAM; receiving an authentication request for providing a card-related service from the terminal when a corresponding card is coupled to the terminal; determining whether the SAM is within the permissible range for operation in response to the authentication request; and transmitting information on a determination result to the terminal.

Determining whether the SAM is within the permissible range may include: decreasing a current value of the operation parameter in response to the authentication request; and determining whether the SAM is within the permissible range for operation using the changed current value of the operation parameter. Transmitting the information on the determination result may include: transmitting a result of authenticating the SAM to the terminal when the decreased value of the operation parameter is larger than a first value; and transmitting a SAM authentication request for authenticating the SAM to the terminal when the decreased value of the operation parameter is smaller than or equal to the first value.

Determining whether the SAM is within the permissible range may include: increasing a counter value in response to the authentication request; and determining whether the SAM is within the permissible range for operation using the counter value. Transmitting the information on the determination result may include: transmitting a result of authenticating the SAM to the terminal when the increased counter value is smaller than the registered value of the operation parameter; and transmitting a SAM authentication request for authenticating the SAM to the terminal when the increased counter value is larger than or equal to the registered value of the operation parameter.

The method further may include updating the current value of the operation parameter using authentication information received via the terminal from the management server as a response to the SAM authentication request, the authentication information being transmitted according to a result of checking a state of the SAM in the management server.

In accordance with another embodiment of the preset disclosure, a method of operating a terminal includes: transmitting, to a secure access module (SAM), an authentication request for providing a card-related service when a corresponding card is coupled to the terminal; determining whether to provide the card-related service or stop operation, according to information received from the SAM as a response to the authentication request; transmitting a SAM authentication request for authenticating the SAM to a management server when an operation of the terminal is stopped according to a determination result; and transmitting, to the SAM, authentication information received from the management server as a response to the SAM authentication request.

The method may further include stopping the operation of the terminal when the information received from the SAM is the SAM authentication request.

The method may further include providing the card-related service when the information received from the SAM is a result of authenticating the SAM.

The method may further include: receiving an operation parameter from the management server, the operation parameter including a registered value indicating a permissible range for operation of the SAM; and storing the operation parameter.

The method may further include: transmitting the operation parameter to the SAM; and transmitting a transmission result of the operation parameter to the management server.

In accordance with still another embodiment of the present disclosure, a method of operating a management server includes: receiving a SAM authentication request for authenticating a SAM from a terminal; checking a state of the SAM in response to the SAM authentication request; and transmitting authentication information on the SAM to the terminal based on a result of checking the state of the SAM.

Checking the state of the SAM may include checking the state of the SAM using identification information of the SAM.

Transmitting the authentication information on the SAM may include transmitting the authentication information on the SAM to the terminal when it is determined that the SAM is in an authorized use state.

The method may further include announcing access to an abnormal SAM when it is determined that the SAM is in an unauthorized use state.

The method may further include: registering an operation parameter indicating a permissible range for operation of the SAM; and transmitting the operation parameter to the terminal.

In accordance with further still another embodiment of the present disclosure, a SAM includes: at least one storage circuit configured to store an operation parameter transmitted via a terminal from a management server, the operation parameter including a registered value indicating a permissible range for operation of the SAM, and have stored therein instructions; and a processor configured to execute the instructions. When the processor executes the instructions, the processor may perform a method including: receiving an authentication request for providing a card-related service from the terminal when a corresponding card is coupled to the terminal; determining whether the SAM is within the permissible range for operation in response to the authentication request; and transmitting, through a transmitter, information on a determination result to the terminal.

Determining whether the SAM is within the permissible range may include: decreasing a current value of the operation parameter in response to the authentication request; and determining whether the SAM is within the permissible range for operation using the changed current value of the operation parameter. Transmitting the information on the determination result may include: transmitting a result of authenticating the SAM to the terminal when the decreased value of the operation parameter is larger than a first value; and transmitting a SAM authentication request for authenticating the SAM to the terminal when the decreased value of the operation parameter is smaller than or equal to the first value.

Determining whether the SAM is within the permissible range may include: increasing a counter value in response to the authentication request; and determining whether the SAM is within the permissible range for operation using the counter value. Transmitting the information on the determination result may include: transmitting a result of authenticating the SAM to the terminal when the increased counter value is smaller than the registered value of the operation parameter; and transmitting a SAM authentication request for authenticating the SAM to the terminal when the increased counter value is equal to or larger than the registered value of the operation parameter.

The method may further include updating the current value of the operation parameter using authentication information received via the terminal from the management server as a response to the SAM authentication request, the authentication information being transmitted according to a result of checking a state of the SAM in the management server.

In accordance with further still another embodiment of the present disclosure, a terminal includes: a memory having stored therein instructions; and a processor configured to execute the instructions. When the processor executes the instructions, the processor performs a method including: transmitting, to a SAM, an authentication request for providing a card-related service when a corresponding card is coupled to the terminal; determining whether to provide the card-related service or stop operation, according to information which is received from the SAM as a response to the authentication request; transmitting, through a transmitter, a SAM authentication request for authenticating the SAM to the management server when an operation of the terminal is stopped according to a determination result; and transmitting, through the transmitter, authentication information received from the management server as a response to the SAM authentication request, to the SAM.

The method may further include: stopping the operation of the terminal when the information received from the SAM is the SAM authentication request; and providing the card-related service when the information received from the SAM is a result of authenticating the SAM.

In accordance with further still another embodiment of the present disclosure, a management server includes: a memory having stored therein instructions; and a processor configured to execute the instructions. When the processor executes the instruction, the processor performs a method including: receiving a SAM authentication request for authenticating a SAM from a terminal; checking a state of the SAM in response to the SAM authentication request; transmitting, through a transmitter, authentication information on the SAM to the terminal when it is determined that the SAM is in an authorized use state; and announcing access to an abnormal SAM when it is determined that the SAM is in an unauthorized use state.

In accordance with further still another embodiment of the present disclosure, a non-transitory computer readable medium has stored thereon a program that, when executed, causes a processor to perform a method, the method including: receiving an operation parameter via a terminal from a management server, the operation parameter including a registered value indicating a permissible range for operation of a SAM; receiving an authentication request for providing a card-related service from the terminal when a corresponding card is coupled to the terminal; determining whether the SAM is within the permissible range for operation in response to the authentication request; and transmitting information on a determination result to the terminal.

In accordance with further still another embodiment of the present disclosure, a non-transitory computer readable medium has stored thereon a program that, when executed, causes a processor to perform a method, the method including: transmitting, to a SAM, an authentication request for providing a card-related service when a corresponding card is coupled to a terminal; determining whether to provide the card-related service or stop operation, according to information which is received from the SAM as a response to the authentication request; transmitting a SAM authentication request for authenticating the SAM to a management server when an operation of the terminal is stopped according to a determination result; and transmitting, to the SAM, authentication information received from the management server as a response to the SAM authentication request.

In accordance with further still another embodiment of the present disclosure, a non-transitory computer readable medium has stored thereon a program that, when executed, causes a processor to perform a method, the method including: receiving a SAM authentication request for authenticating a SAM from a terminal; checking a state of the SAM in response to the SAM authentication request; and transmitting authentication information on the SAM to the terminal based on a checking result.

According to embodiments of the present disclosure, a permissible range for operation of a SAM may be set by an operation parameter. When the SAM is out of the permissible range for operation, the SAM may be set so that it cannot be used without authentication of a management server. Thus, unauthorized use, which may occur due to loss or robbery of the SAM, may be prevented, and a loss of money caused by the unauthorized use may be prevented.

DESCRIPTION OF SPECIFIC EMBODIMENTS

Figure 1:
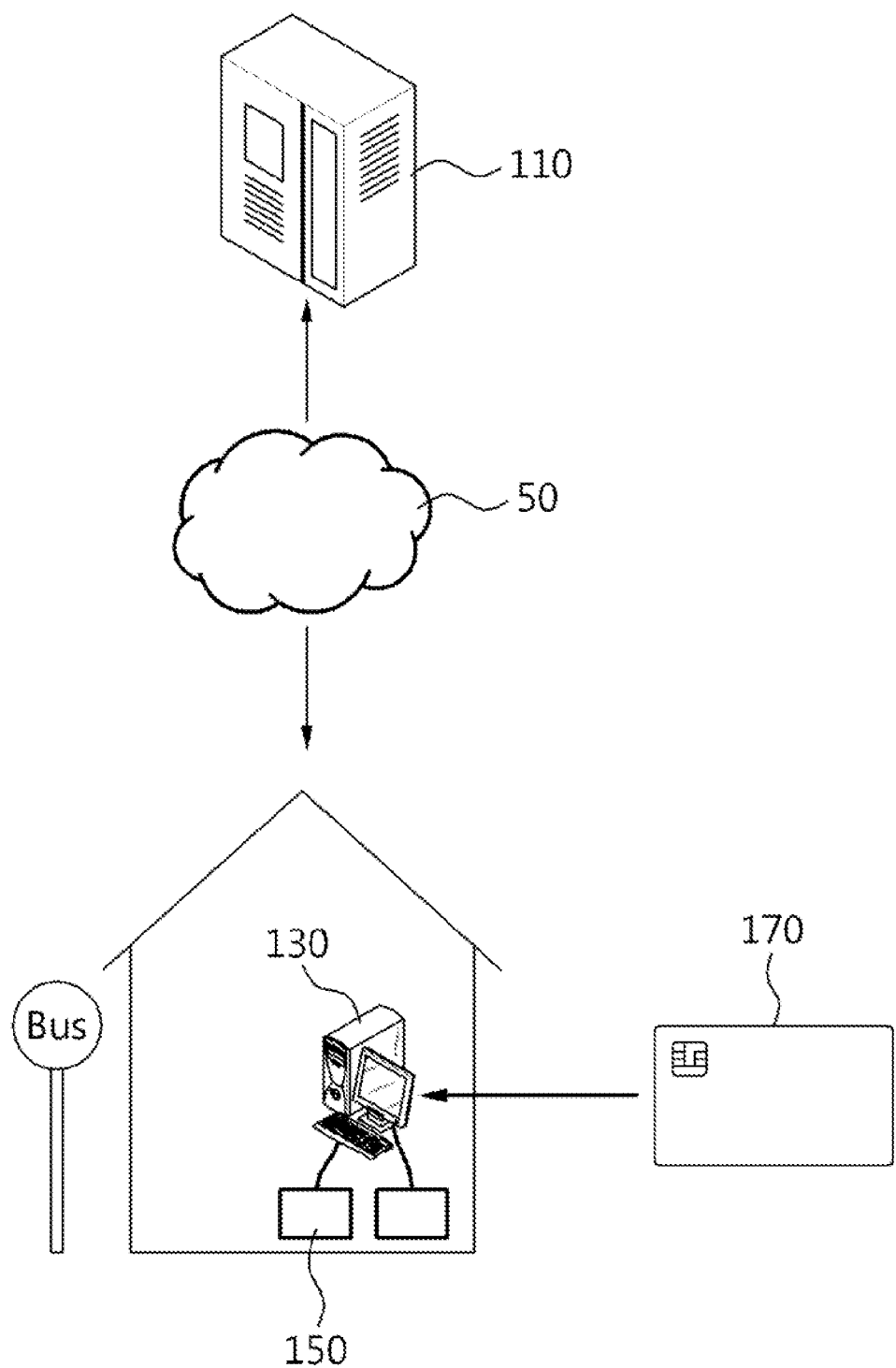
FIG. 1 illustrates a secure access system according to an embodiment of the present disclosure.

Hereafter, embodiments of the present disclosure will be described below in more detail with reference to the accompanying drawings. Throughout the drawings, like reference numerals refer to like parts.

The present disclosure describes several specific embodiments. However, embodiments are not limited by the description of specific embodiments provided herein, but may include modifications, equivalents or substitutes thereof.

The terms used herein to describe embodiments are used only for explaining the specific embodiments, and do not limit the embodiments. Terms of a singular form do not exclude the possibility of plural forms unless the contrary is indicated. In this specification, the meaning of "include/comprise" or "have" specifies a property, a figure, a step, a process, an element, a component, or a combination thereof which is described in the specification, but does not exclude one or more other properties, numbers, steps, processes, elements, components, or combinations thereof.

Terms used herein having technical or scientific meanings have the same meanings as the terms which are generally understood by those skilled in the art to which the present disclosure pertains, unless they are differently defined. Terms defined in a generally used dictionary may be interpreted to have meanings which coincide with contextual meanings in the related art. Unless clearly defined in this specification, terms should not be interpreted as having excessively formal or technical meaning.

In the accompanying drawings, like reference numerals refer to like elements and duplicative descriptions thereof may be omitted. In addition, detailed descriptions related to well-known functions or configurations may be omitted so that features of embodiments are not unnecessarily obscured.

FIG. 1 illustrates a secure access system 100 according to an embodiment of the present disclosure. The secure access system 100 includes a management server 110, a terminal 130, and a secure access module (SAM) 150. The management server 110 and the terminal 130 communicate with each other through a wired or wireless network 50 such as the Internet. The secure access system 100 may include one or more management servers 110 communicating with the terminal 130. However, embodiments are not limited thereto. In other embodiments, the secure access system 100 includes one or more other components in addition to the above components.

The terminal 130 and the SAM 150 may be coupled through wired or wireless communications, and a plurality of SAMs 150 may be coupled to the terminal 130. The management server 110 may also be referred to as a 'management center'.

The management server 110 may set and register an operation parameter indicating a permissible range for operation of the SAM 150. The management server 110 may transmit the operation parameter to the SAM 150 via the terminal 130 so as to set a minimum use standard of the SAM 150.

The SAM 150 receives and stores the operation parameter. After that, the SAM 150 may receive an authentication request for providing a card-related service from the terminal 130, and check whether the SAM 150 is out of the permissible range for operation or not based on information obtained by processing a corresponding card in response to the authentication request.

For example, the SAM 150 receiving the authentication request may change a current value of the operation parameter so as to operate only within the predetermined permissible range for operation (for example, a number of operations).

If the current value of the operation parameter of the SAM 150 is out of the permissible range for operation thereof (i.e., a permissible range of the operation parameter), the SAM 150 may send a request to authenticate the SAM 150 (hereinafter, referred to as "SAM authentication request") to the management server 110 via the terminal 130. The SAM 150 may receive authentication information which the management server 110 provides in response to the SAM authentication request, and update the current value of the operation parameter based on the authentication information. As a result, the SAM 150 can operate normally.

The terminal 130 may receive from a user a request for providing a card-related service, and send an authentication request to the SAM 150. The request for providing the card-related service may be generated, for example, when the smart card 170 is coupled to the terminal 130. For example, a user may couple the smart card 170 to the terminal 130 so as to transfer money to the smart card 170 or to settle an amount.

If the authentication is not successfully performed in the SAM 150, the terminal 130 may stop providing a corresponding card-related service, and inquire of the management server 110 about whether a state of the SAM 150 coupled to the terminal 130 is normal, e.g., whether the SAM 150 is in an authorized use state.

If the terminal 130 receives authentication information from the management server 110, the terminal 130 may resume providing the corresponding card-related service. The management server 110 may transmit the authentication information when the state of the SAM 150 coupled to the terminal 130 is normal.

The management server 110 may determine the state of the SAM 150 coupled to the terminal 130. If it is determined that the state of the SAM 150 is abnormal, i.e., it is determined that the SAM 150 is in an unauthorized use state, the management server 110 may announce the access of the abnormal SAM and stop an operation of the corresponding SAM.

When identification information of the SAM 150 is not registered or corresponds to lost or stolen identification information, the management server 110 may determine that the state of the SAM 150 is abnormal.

If it is determined that the state of the SAM 150 is normal, the management server 110 may transmit authentication information to the SAM 150 via the terminal 130.

The SAM 150 receiving the authentication information from the management server 110 may update the current value of the operation parameter based on the authentication information and resume its operation.

Figure 2:
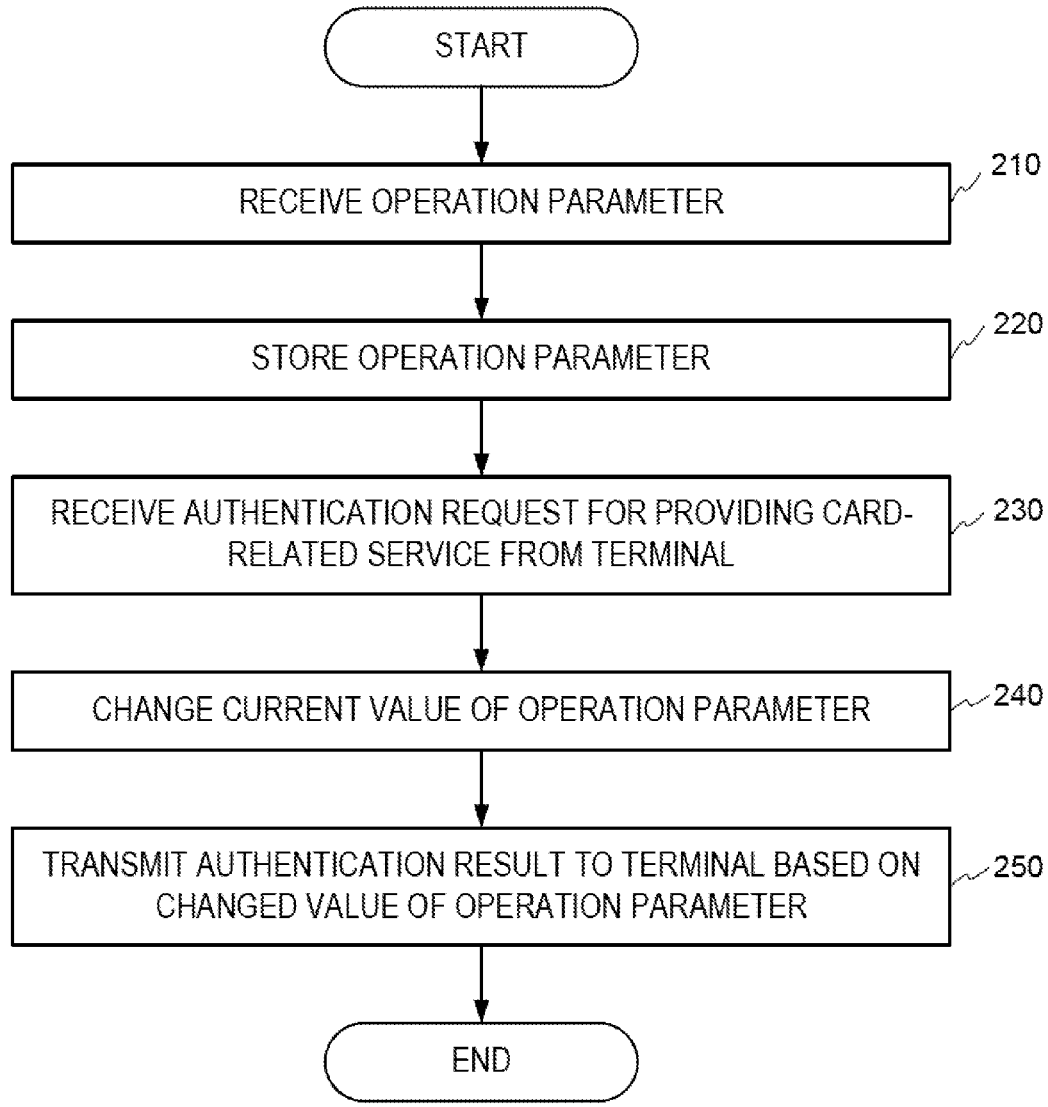
FIG. 2 is a flowchart illustrating an operating method of a secure access module according to an embodiment of the present disclosure.

FIG. 2 is a flowchart illustrating an operating method of a SAM according to an embodiment of the present disclosure.

Referring to FIG. 2, the SAM receives an operation parameter transmitted from a management server via a terminal at 210, and stores the operation parameter at 220. The operation parameter transmitted from the management server may include a registered value indicating a permissible range for operation of the SAM. In an embodiment, the permissible range for operation includes a predetermined number of operations.

After that, whenever a corresponding card is processed, the SAM receives an authentication request for providing a card-related service from the terminal at 230, and then the SAM changes a current value of the operation parameter in response to the authentication request from the terminal at 240. In an embodiment, the SAM may decrease the value of the operation parameter after providing the card-related service according to the authentication request from the terminal. In another embodiment, the SAM may increase a counter value after providing the card-related service according to the authentication request from the terminal. The counter value is separately generated from the operation parameter.

At 250, the SAM transmits an authentication result to the terminal based on the current value of the operation parameter that is changed at 240.

Figure 3:
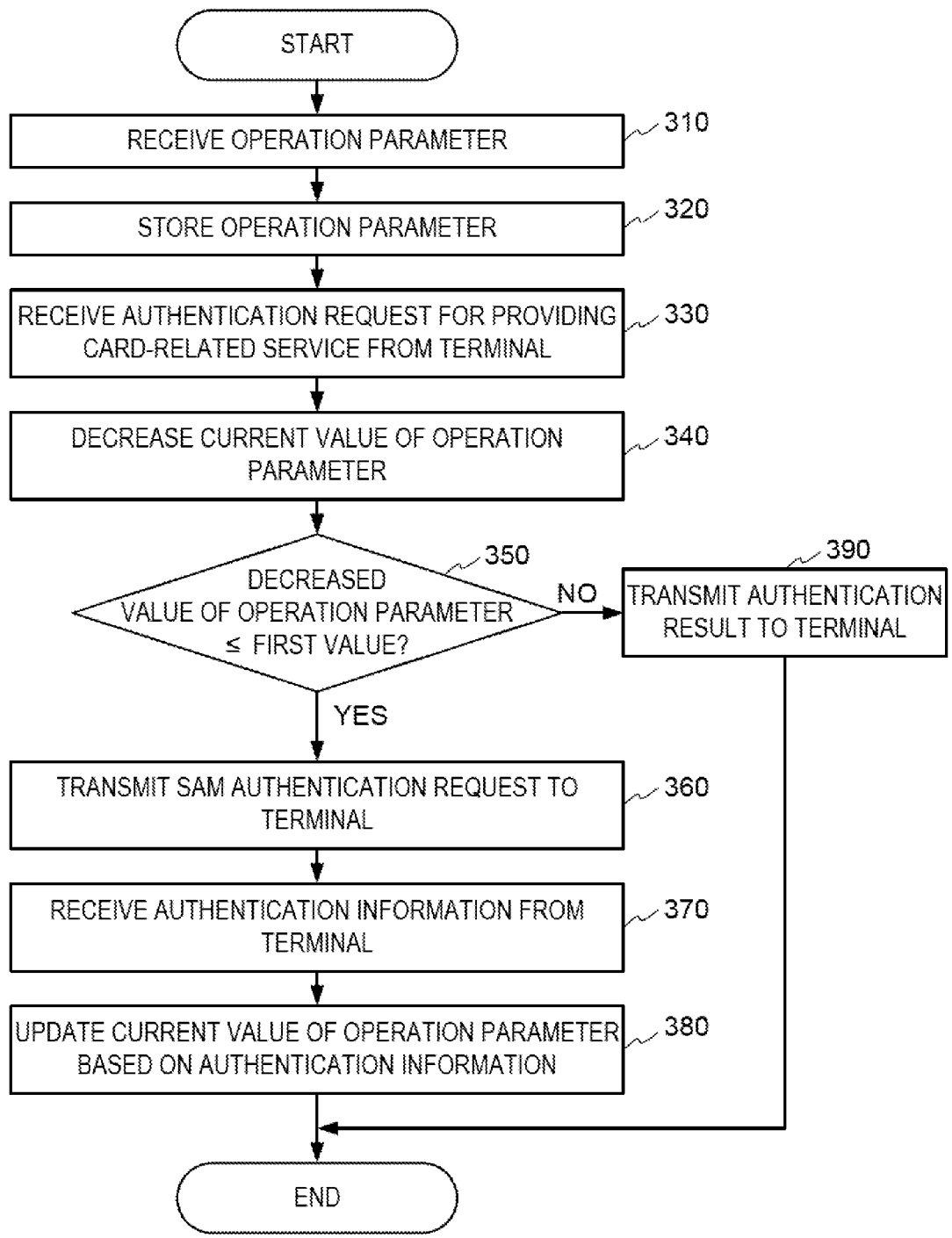
FIG. 3 is a flowchart illustrating an operating method of a secure access module according to another embodiment of the present disclosure.

FIG. 3 is a flowchart illustrating an operating method of a SAM according to another embodiment of the present disclosure.

Referring to FIG. 3, the SAM receives an operation parameter transmitted from a management server via a terminal at 310, and stores the operation parameter at 320.

The SAM receives an authentication request for providing a card-related service from the terminal at 330.

The SAM decreases a current value of the operation parameter in response to the authentication request from the terminal at 340.

The SAM determines whether the value of the operation parameter, decreased at 340, is smaller than or equal to a first value, at 350.

If it is determined at 350 that the value of the operation parameter is larger than the first value, the SAM transmits an authentication result to the terminal at 390. The first value may be set to '0'.

If it is determined at 350 that the value of the operation parameter is smaller than or equal to the first value, the SAM transmits a SAM authentication request to the terminal at 360.

At 370, the SAM receives authentication information which is transmitted from the management server via the terminal. The management server checks a state of the SAM and generates the authentication information, in response to the SAM authentication request transmitted at 360.

At step S380, the SAM updates the current value of the operation parameter based on the authentication information from the management server.

The authentication information may be transmitted from the management server according to a result obtained by checking a state of the SAM. The authentication information may include information indicating whether the corresponding SAM is normal or abnormal and/or a new value of the operation parameter for the corresponding SAM.

The SAM receiving the authentication information may update the current value of the operation parameter with a previously stored registered value of the operation parameter, or update the current value of the operation parameter with a new value of the operation parameter that is included in the authentication information transmitted from the management server.

Figure 4:
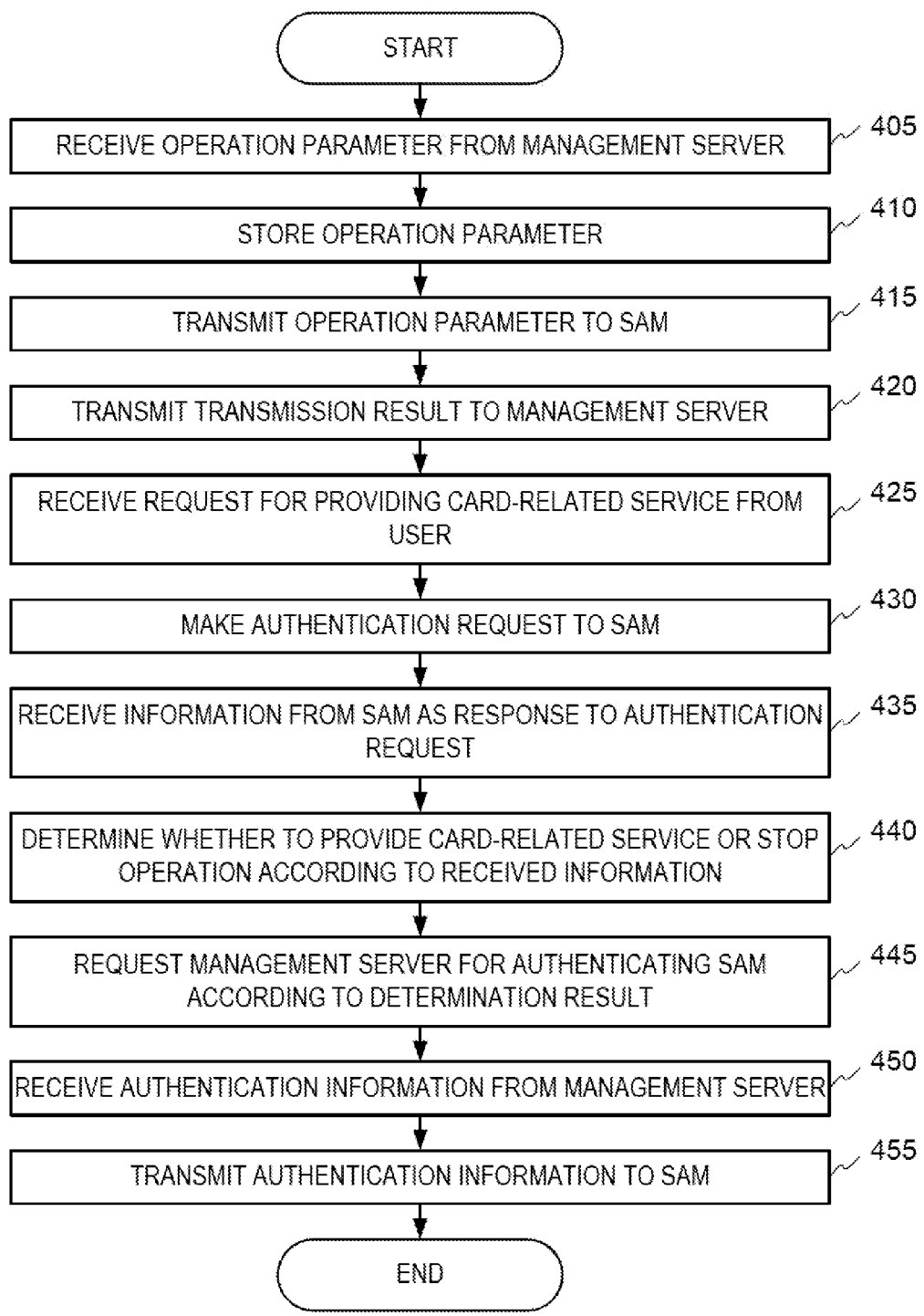
FIG. 4 is a flowchart illustrating an operating method of a terminal according to an embodiment of the present disclosure.

FIG. 4 is a flowchart illustrating an operating method of a terminal according to an embodiment of the present disclosure.

Referring to FIG. 4, the terminal receives an operation parameter indicating a permissible range for operation of a SAM from a management server at 405, and stores the operation parameter at 410.

The terminal transmits the operation parameter to the SAM at 415, and transmits a transmission result of the operation parameter to the management server at 420.

The terminal receives from a user a request for providing a card-related service at 425.

The terminal receiving the request from the user at 425 sends an authentication request to the SAM at 430.

At 435, the terminal receives information from the SAM as a response to the authentication request at 430. The information received from the SAM may include a SAM authentication request or an authentication result of the SAM.

The terminal may receive the authentication result of the SAM from the SAM when the SAM is available, that is, when the SAM is within the permissible range for operation.

The terminal may receive the SAM authentication request from the SAM when the SAM is not available, that is, when the SAM is out of the permissible range for operation.

At 440, the terminal determines whether to provide a card-related service or stop operation according to the information received at 435.

At 445, the terminal requests the management server for authenticating the SAM according to a determination result at 440.

The terminal receives authentication information from the management server at 450, and transmits the received authentication information to the SAM at 455. The management server checks a state of the SAM and generates the authentication information, in response to the request at 445.

Figure 5:
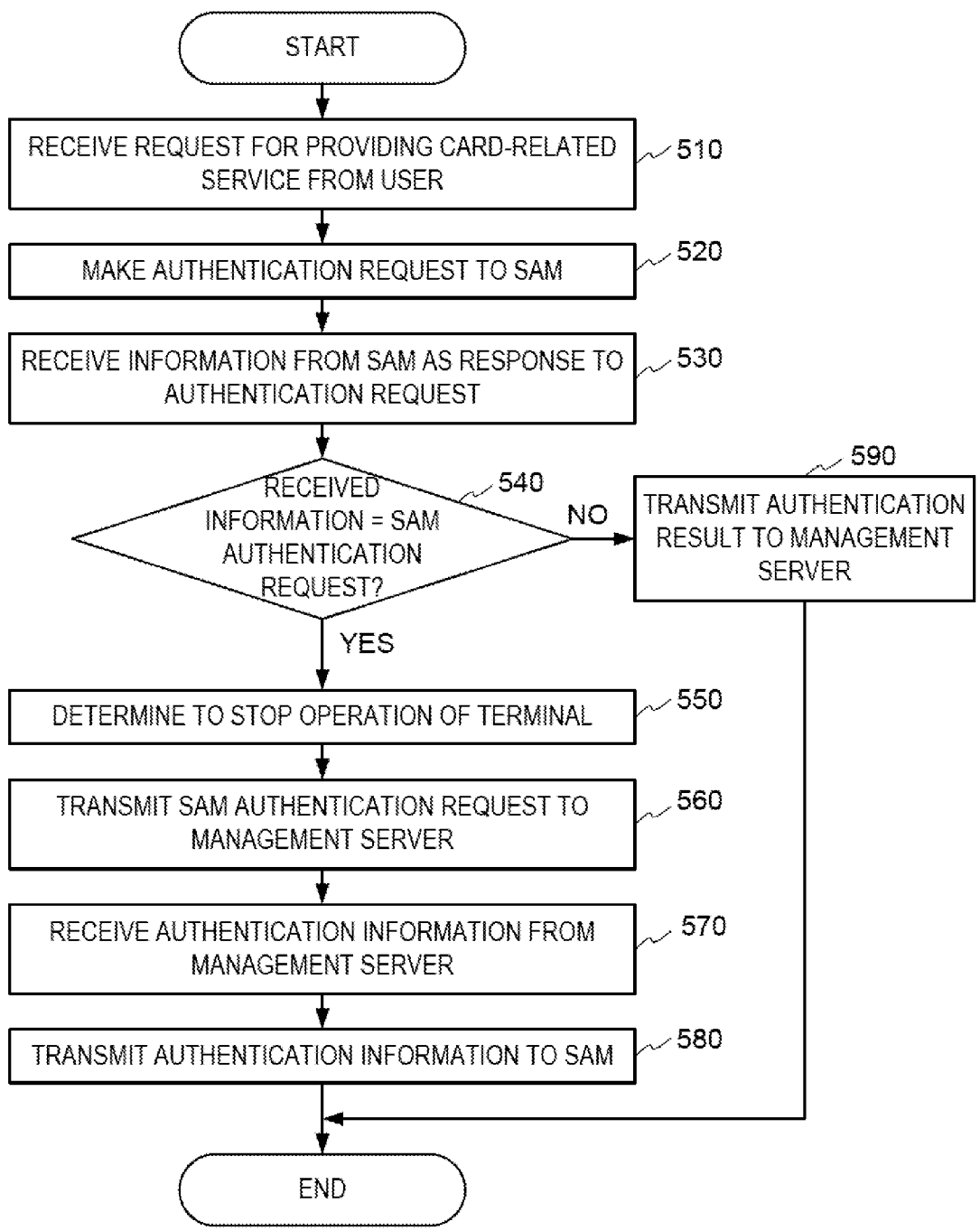
FIG. 5 is a flowchart illustrating an operating method of a terminal according to another embodiment of the present disclosure.

FIG. 5 is a flowchart illustrating an operating method of a terminal according to another embodiment of the present disclosure.

Referring to FIG. 5, the terminal receives from a user a request to provide a card-related service at 510.

The terminal receiving the request at 510 makes an authentication request to a SAM at 520.

At 530, the terminal receives information from the SAM as a response to the authentication request at 520. The information received from the SAM may include a SAM authentication request or an authentication result of the SAM.

At 540, the terminal determines whether the information received at 530 is the SAM authentication request.

If it is determined at 540 that the received information is not the SAM authentication request, that is, if it is determined that the received information is the authentication result of the SAM, the terminal transmits the authentication result to a management server at 590.

On the other hand, if it is determined at 540 that the received information is the SAM authentication request, the terminal determines to stop operation thereof at 550.

According to a determination result of 550, the terminal transmits the SAM authentication request to the management server at 560.

At 570, the terminal receives authentication information from the management server. The management server checks a state of the SAM and generates the authentication information, in response to the SAM authentication request.

The terminal transmits the authentication information received at 570 to the SAM at 580.

Figure 6:
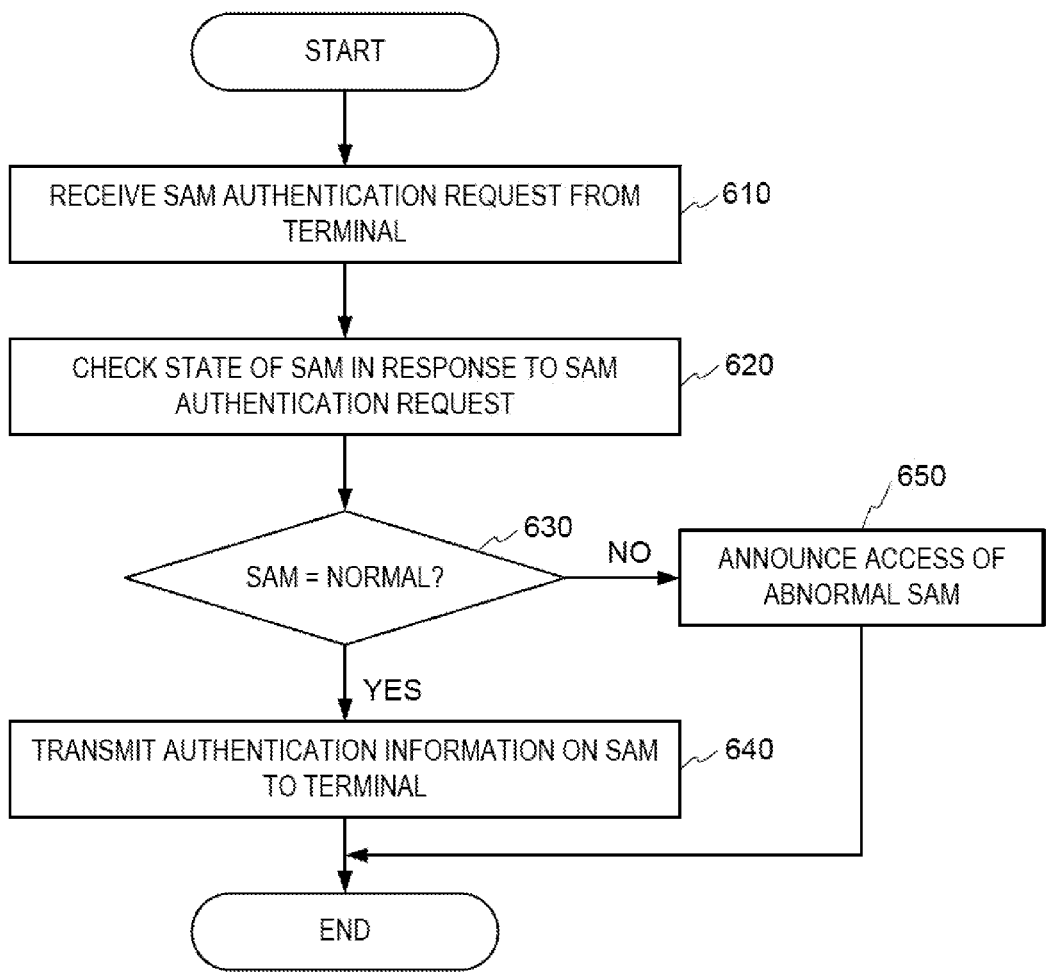
FIG. 6 is a flowchart illustrating an operating method of a management server according to an embodiment of the present disclosure.

FIG. 6 is a flowchart illustrating an operating method of a management server according to an embodiment of the present disclosure.

Referring to FIG. 6, the management server receives a SAM authentication request from a terminal at 610.

At 620, the management server checks a state of the SAM in response to the SAM authentication request received at

610. In an embodiment, the management server may check the state of the SAM using identification information of the SAM.

The management server determines whether the SAM is normal or not at 630.

If it is determined at 630 that the SAM is normal, the management server transmits authentication information on the SAM to the terminal at 640.

On the other hand, if it is determined at 630 that the SAM is abnormal, the management server announces the access of the abnormal SAM at 650.

In addition to the steps illustrated in FIG. 6, a method in accordance with an embodiment may further include registering an operation parameter indicating a permissible range for operation of the SAM and transmitting the operation parameter to the terminal.

Figure 7:
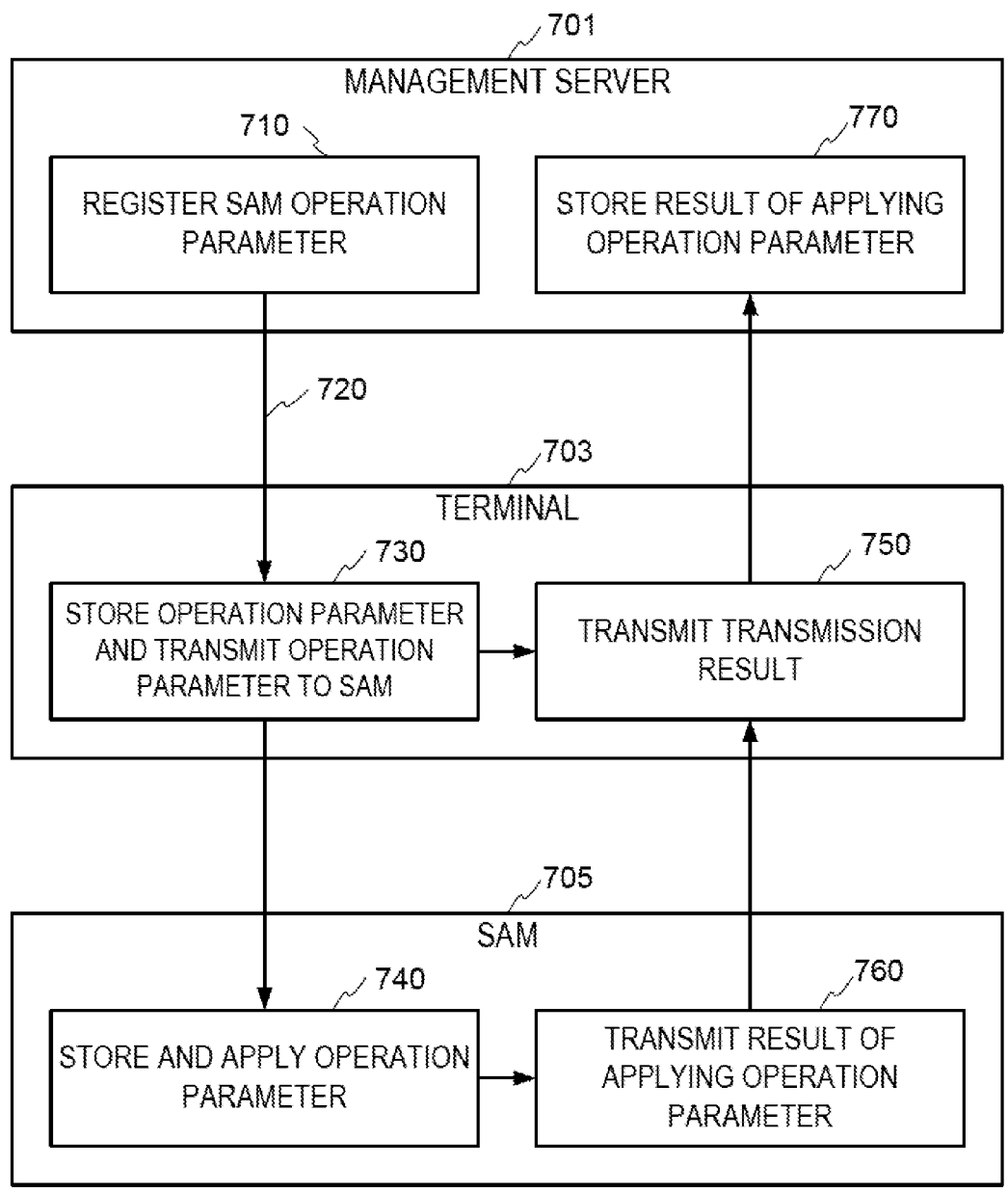
FIG. 7 illustrates a method for setting an operation parameter of a secure access module in a secure access system according to an embodiment of the present disclosure.

FIG. 7 illustrates a method for setting an operation parameter of a SAM in a secure access system according to an embodiment of the present disclosure.

Referring to FIG. 7, the secure access system includes a management server 701, a terminal 703, and a SAM 705.

The management server 701 sets and registers an operation parameter for the SAM 705 at 710. The operation parameter indicates a permissible range for operation of the SAM 705. In an embodiment, the permissible range for operation includes a permissible number of operations. The management server 701 may store the operation parameter to correspond to the SAM 705.

The management server 701 transmits the operation parameter to the terminal 703 at 720.

The terminal 703 stores the operation parameter received from the management server 701, and then transmits the operation parameter to the SAM 705 at 730.

The SAM 705 stores the operation parameter received from the terminal 703, and applies a registered value of the operation parameter thereto at 740. The registered value of the operation parameter is determined when the management server 701 registers the operation parameter at 710.

After transmitting the operation parameter to the SAM 705, the terminal 703 transmits a transmission result of the operation parameter to the SAM 705 to the management server 701 at 750.

At 760, a result of applying the operation parameter is transmitted to the management server 701 via the terminal 703.

FIG. 7 shows that the transmission result of the operation parameter and the result of applying the operation parameter are separately transmitted to the management server 701. However, in another embodiment, the terminal 703 transmits the transmission result of the operation parameter together with the result of applying the operation parameter.

The management server 701 receiving the result of applying the operation parameter from the terminal 703 stores the result of applying the operation parameter at 770.

Figure 8:
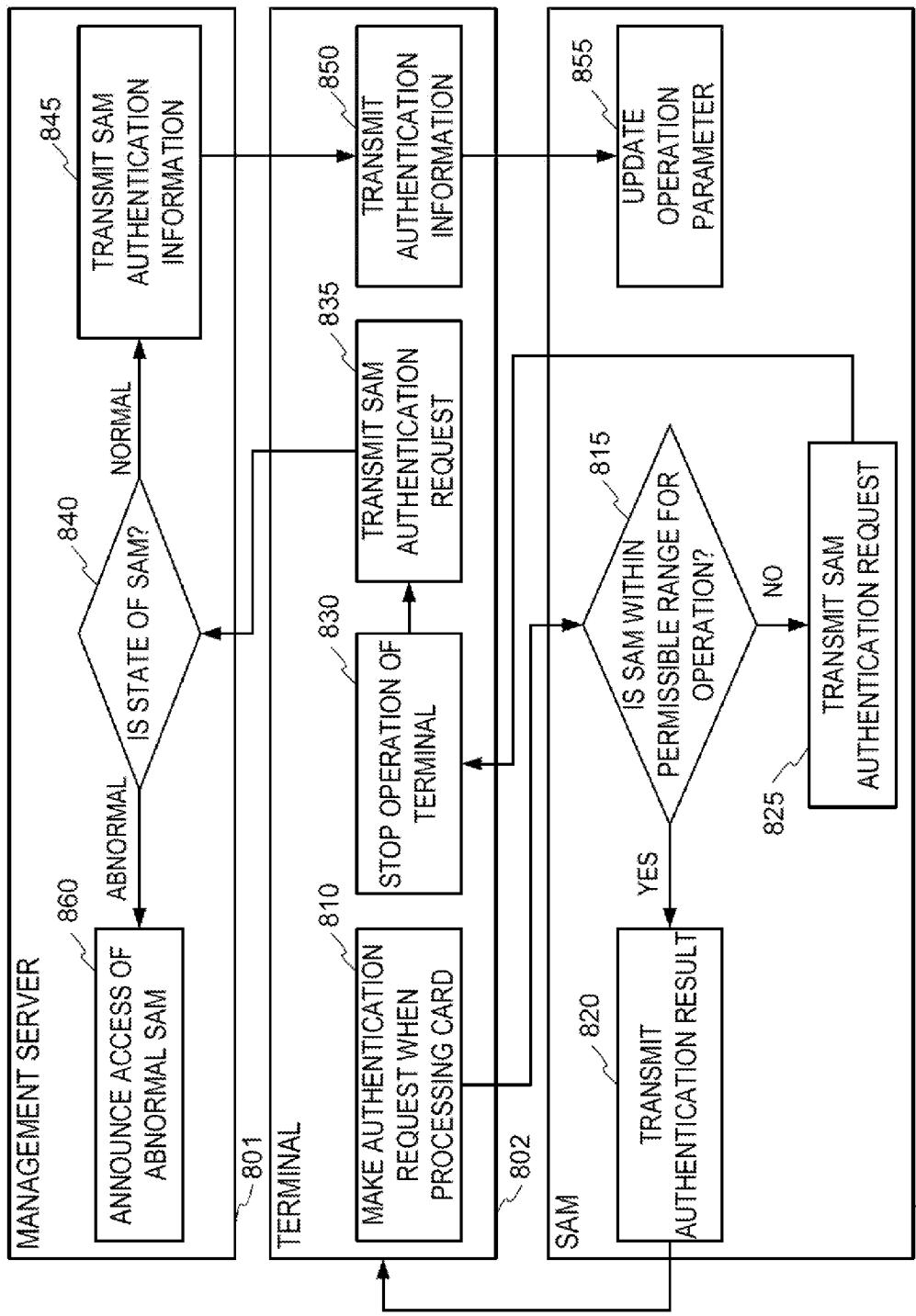
FIG. 8 illustrates operations performed among a management server, a terminal, and a secure access module in a secure access system according to an embodiment of the present disclosure.

FIG. 8 illustrates operations performed among a management server, a terminal, and a SAM in a secure access system according to an embodiment of the present disclosure.

Referring to FIG. 8, the secure access system includes a management server 801, a terminal 802, and a SAM 803.

When a request for providing a card-related service is received from a user as a corresponding card is coupled to the terminal 802, the terminal 802, in attempting to process a card-related service for the corresponding card, makes an authentication request to the SAM 803 at 810.

The SAM 803 receiving the authentication request for providing the card-related service from the terminal 802 determines whether the SAM 802 is out of a permissible range for operation thereof, at 815.

A method for checking whether the SAM 803 is out of the permissible range for operation may be performed as follows.

The SAM 803 may decrease a current value of the operation parameter by '1' in response to the authentication request from the terminal 802, and determine whether the decreased value of the operation parameter is larger than '0'.

If the decreased value of the operation parameter is larger than '0', the SAM 803 may determine that the SAM 803 is within the permissible range for operation, i.e., that the SAM 803 is available. On the other hand, if the decreased value of the operation parameter is smaller than or equal to '0', the SAM 803 may determine that the SAM 803 is out of the permissible range for operation, i.e., that the SAM 803 is not available.

In another embodiment, the SAM 803 may increase a counter value, which is separately generated from the operation parameter, in response to the authentication request from the terminal 802, and compare the increased counter value with a registered value of the operation parameter so as to check whether the counter value is out of the permissible range for operation. The registered value of the operation parameter is determined when the management server 801 registers the operation parameter for the SAM 803. For example, if the registered value of the operation parameter is '10' and the increased counter value is equal to or larger than '10', the SAM 803 may determine that the SAM 803 is out of the permissible range for operation. On the other hand, if the registered value of the operation parameter is '10' and the increased counter value is smaller than '10', the SAM 803 may determine that the SAM 803 is within the permissible range for operation.

If it is determined at 815 that the SAM 803 is within the permissible range for operation, the SAM 803 transmits an authentication result to the terminal 802, at 820. The terminal 802 receiving the authentication result from the SAM 803 may provide a card-related service for the corresponding card. The card-related service may include transferring money to the card or reducing the amount of money on the card.

If it is determined at 815 that the SAM 803 is out of the permissible range for operation, the SAM 803 transmits a SAM authentication request to the terminal 802 at 825.

The terminal 802 receiving the SAM authentication request from the SAM 803 stops operation at 830, and requests the management server 801 to authenticate the SAM 803 at 835.

In response to the SAM authentication request, the management server 801 checks a state of the SAM 803 at 840. At 840, the management server 801 may check the state of the SAM 803 using identification information of the SAM 803. In an embodiment, if the identification information of the SAM 803 is not registered in the management server 801 or corresponds to lost or stolen identification information, the management server 801 determines that the state of the SAM 803 is abnormal.

If it is determined at 840 that the state of the SAM 803 is abnormal, the management server 801 announces the access to the abnormal SAM at 860. In an embodiment, if it is determined at 840 that the state of the SAM 803 is abnormal, the management server 801 transmits an operation parameter having '0' to the terminal 802. As a result, the SAM 803 is set not to operate, in response to the operation parameter having '0'.

If it is determined at 840 that the state of the SAM 803 is normal, the management server 801 transmits authentication information on the SAM 803 to the terminal 802 at 845.

The terminal 802 receiving the authentication information from the management server 801 transmits the authentication information to the SAM 803 at 850.

The SAM 803 receiving the authentication information from the terminal 802 updates the current value of the operation parameter based on the authentication information at 855.

Figure 9:
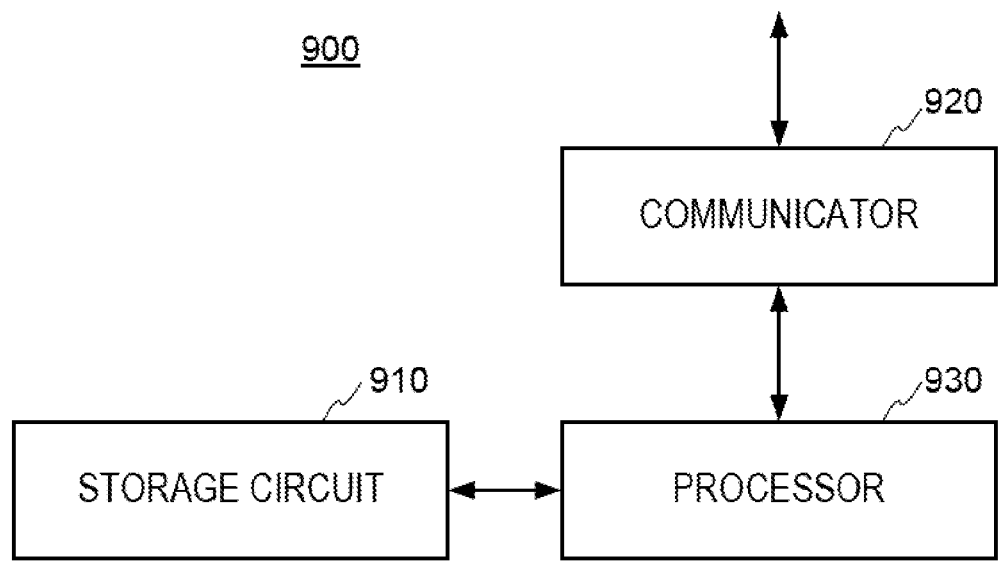
FIG. 9 illustrates a secure access module according to an embodiment of the present disclosure.

FIG. 9 illustrates a SAM according to an embodiment of the present disclosure. The SAM 900 includes a storage circuit 910, a communicator 920, and a processor 930. However, embodiments are not limited thereto. In other embodiments, the SAM 900 includes one or more other components, such as a memory, in addition to the above components. In an embodiment, the communicator 920 may include a receiver and/or a receiver.

The storage circuit 910 may store an operation parameter transmitted from a management server through a terminal. The operation parameter from the management server may include a registered value indicating a permissible range for operation of the SAM 900.

The communicator 920 may receive an authentication request for providing a card-related service from the terminal when a user couples a corresponding card to the terminal.

The processor 930 may change a current value of the operation parameter in response to the authentication request provided through the communicator 920, determine whether the SAM is within the permissible range for operation, and transmit a determination result to the terminal.

For example, if the changed value of the operation parameter is larger than a first value (for example, '0'), the processor 930 may determine that the SAM 900 is within the permissible range for operation, and transmit the authentication result to the terminal. On the other hand, if the changed value of the operation parameter is smaller than or equal to the first value, the processor 930 may determine that the SAM 900 is out of the permissible range for operation, and transmit a SAM authentication request to the terminal.

In another embodiment, the processor 930 may increase a counter value, which is separately generated from the operation parameter, in response to the authentication request provided through the communicator 920, compare the increased counter value to the registered value of the operation parameter, and transmit the authentication result to the terminal.

For example, when the registered value of the operation parameter is '10' and the increased counter value is equal to '10', the processor 930 may transmit a SAM authentication request to the terminal. On the other hand, when the increased counter value is smaller than '10', the processor 930 may transmit the authentication result of the SAM 900 to the terminal.

Furthermore, the processor 930 may update the current value of the operation parameter using authentication information transmitted from the management server through the terminal, the authentication information being provided to the SAM 900 as a response to the SAM authentication request. The authentication information may include information which is determined according to a result of checking a state of the SAM 900 in the management server.

Figure 10:
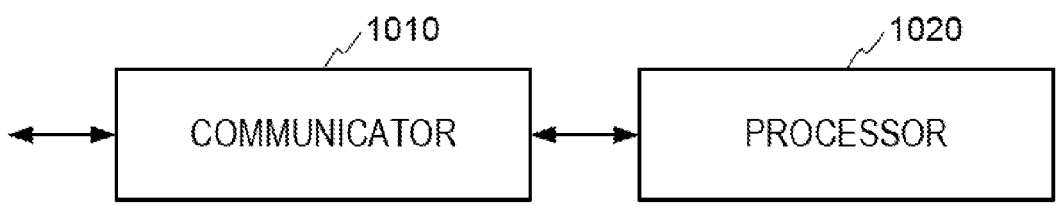
FIG. 10 illustrates a terminal according to an embodiment of the present disclosure.

FIG. 10 illustrates a terminal according to an embodiment of the present disclosure. The terminal 1000 includes a communicator 1010 and a processor 1020. However, embodiments are not limited thereto. In other embodiments, the terminal 1000 includes one or more other components, such as a memory, in addition to the above components. In an embodiment, the communicator 1010 may include a receiver and/or a receiver.

The communicator 1010 may receive a request for providing a card-related service from a user as the user couples a corresponding card to the terminal 1000, and make an authentication request to a SAM in response to the request for providing the card-related service.

The processor 1020 may determine whether to provide the card-related service or stop operation based on information which is received from the SAM as a response to the authentication request. The information received from the SAM may include a SAM authentication request for authenticating the SAM or an authentication result of the SAM.

If the information received from the SAM is the SAM authentication request, the processor 1020 may determine whether to stop the operation of the terminal. If the information received from the SAM is the authentication result of the SAM, the processor 1020 may provide the card-related service.

The communicator 1010 may provide the SAM authentication request to a management server when its operation is stopped. The communicator 1010 may transmit authentication information, which is received from the management server as a response to the SAM authentication request, to the SAM.

Figure 11:
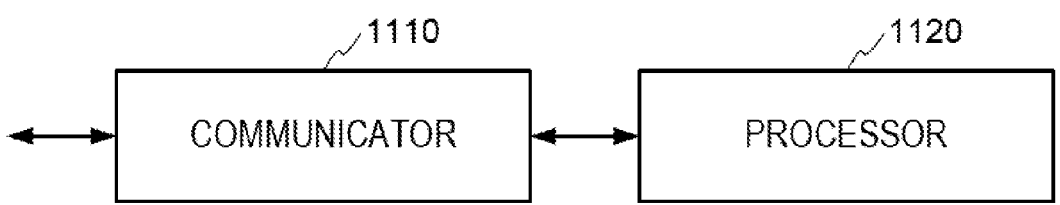
FIG. 11 illustrates a management server according to an embodiment of the present disclosure.

FIG. 11 illustrates a management server according to an embodiment of the present disclosure. The management server 1100 includes a communicator 1110 and a processor 1120. However, embodiments are not limited thereto. In other embodiments, the management server 1100 includes one or more other components, such as a memory, in addition to the above components. In an embodiment, the communicator 1110 may include a receiver and/or a receiver.

The communicator 1110 may receive a SAM authentication request from a terminal.

The processor 1120 may check a state of a SAM in response to the SAM authentication request received through the communicator 1110. If it is determined that the state of the SAM is normal, the processor 1120 may transmit authentication information on the SAM to the terminal. If it is determined that the state of the SAM is abnormal, the processor 1120 may announce the access to the abnormal SAM.

In accordance with an embodiment of the present disclosure, the above methods may be implemented in the form of program commands which can be executed by various computer devices, and the program commands may be written in a non-transitory computer readable medium. The computer readable medium may store program command(s), data file, a data structure, or a combination thereof. Examples of computer readable media may include magnetic media such as a hard disk, a floppy disk and a magnetic tape, optical media such as CD-ROM and DVD, magneto-optical media such as a floptical disk, and hardware devices, such as ROM, RAM and flash memory, configured to store and execute program command(s). Examples of the program commands may include a machine language code created by a compiler and a high-level language code executed by a computer using an interpreter or the like. The hardware device may be configured to operate as one or more software modules to perform embodiments of the present disclosure.

While the present disclosure has described specific embodiments, the present invention is not limited to the above-described embodiments, and it will be apparent to those skilled in the art that various changes and modifications may be made from the embodiments.

Thus, the scope of the present invention is not limited to the above-described embodiments, but may be defined by the following claims and equivalents to the claims.

What is claimed is:

1. An operating method of a secure access module (SAM), the operating method comprising:
   storing an operation parameter transmitted via a terminal from a management server, the operation parameter including a registered value indicating a permissible range for operation of the SAM;
   receiving an authentication request for providing a card-related service from the terminal when a corresponding card is coupled to the terminal;
   determining whether the SAM is within the permissible range for operation in response to the authentication request; and
   transmitting information on a determination result to the terminal,
   wherein the determining step comprises:
      decreasing a current value of the operation parameter in response to the authentication request; and
      determining whether the SAM is within the permissible range for operation using the changed current value of the operation parameter,
   wherein transmitting the information on the determination result comprises:
      transmitting a result of authenticating the SAM to the terminal when the decreased value of the operation parameter is larger than a first value; and
      transmitting a SAM authentication request for authenticating the SAM to the terminal when the decreased value of the operation parameter is smaller than or equal to the first value,
   wherein the method further comprises updating the current value of the operation parameter using authentication information transmitted via the terminal from the management server as a response to the SAM authentication request, the authentication information being transmitted according to a result of checking a state of the SAM in the management server, and at least one of the method steps is implemented by a hardware processor.

2. The operating method according to claim 1,
   wherein the determining step comprises:
      increasing a counter value in response to the authentication request; and
      determining whether the SAM is within the permissible range for operation using the counter value, and
   wherein transmitting the information on the determination result comprises:
      transmitting a result of authenticating the SAM to the terminal when the increased counter value is smaller than the registered value of the operation parameter; and
      transmitting a SAM authentication request for authenticating the SAM to the terminal when the increased counter value is larger than or equal to the registered value of the operation parameter.

3. A SAM comprising:
   a storage circuit configured to store an operation parameter transmitted via a terminal from a management server, the operation parameter including a registered value indicating a permissible range for operation of the SAM;
   a memory having stored therein instructions; and
   a processor being controlled by the instructions and performing a method, the method comprising:
      receiving an authentication request for providing a card-related service from the terminal when a corresponding card is coupled to the terminal;
      determining whether the SAM is within the permissible range for operation in response to the authentication request; and
      transmitting information on a determination result to the terminal,
   wherein the determining step comprises:
      decreasing a current value of the operation parameter in response to the authentication request; and
      determining whether the SAM is within the permissible range for operation using the changed current value of the operation parameter, and
   wherein transmitting the information on the determination result comprises:
      transmitting a result of authenticating the SAM to the terminal when the decreased value of the operation parameter is larger than a first value; and
      transmitting a SAM authentication request for authenticating the SAM to the terminal when the decreased value of the operation parameter is smaller than or equal to the first value, and
   wherein the method further comprises updating the current value of the operation parameter using authentication information transmitted via the terminal from the management server as a response to the SAM authentication request, the authentication information being transmitted.

4. The SAM according to claim 3,
   wherein the determining step comprises:
      increasing a counter value in response to the authentication request; and
      determining whether the SAM is within the permissible range for operation using the counter value, and
   wherein transmitting the information on the determination result comprises:
      transmitting a result of authenticating the SAM to the terminal when the increased counter value is smaller than the registered value of the operation parameter; and
      transmitting a SAM authentication request for authenticating the SAM to the terminal when the increased counter value is equal to or larger than the registered value of the operation parameter.

* * * * *